United States Patent Office 3,151,185
Patented Sept. 29, 1964

3,151,185
POLYMER COMPOSITIONS AND TEXTILE
FIBERS PRODUCED THEREFROM
Riero Giustiniani, Giulio Natta, Mario Farina, and Giorgio Mazzanti, Milan, and Giovanni Crespi, Busto Arsizio, Italy, assignors to Montecatini Società Generale per l'Industria Mineraria e Chimica, Milan, Italy, a corporation of Italy
No Drawing. Filed Jan. 9, 1962, Ser. No. 165,473
Claims priority, application Italy Jan. 11, 1961
20 Claims. (Cl. 260—889)

The present invention relates to polymer compositions having improved chemical and physical characteristics and particularly an improved affinity for dyestuffs.

It is known that some crystalline linear synthetic polymers having melting temperatures between 150° and 300° C., obtained from hydrocarbon monomers can be used for producing textile fibers.

Many crystalline polymers of alpha-olefins, such as for example, isotactic polypropylene, although they possess superior mechanical properties and are light-weight, do, however, because of their particular chemical make-up, possess a poor affinity for dyestuffs. Several processes have been suggested in order to improve the affinity of these polymers for dyestuffs, such as the addition of suitable substances, which are soluble in the molten poly-alpha-olefins, to the polymer before the spinning operation. For example, the addition of basic substances makes the dyeing with acid dyestuffs easier while the addition of acid substances favors the dyeing with basic dyestuffs.

However, these processes are not wholly satisfactory because the added substances do not remain dissolved in the polyolefins when they solidify and crystallize, but separate in a non-uniform manner from the polymer, and thus reduce the mechanical resistance of the yarns or fibers produced from these polymeric compositions.

Furthermore, these added substances cause the formation of a phase separate from that of the mechanically resistant fiber material and therefore are easily removed from the fiber material both in the wet washings using surfactants and in the dry washings when employing organic solvents.

It has also been suggested to increase the dye affinity of polyolefin fibers such as by grafting polymer chains onto the polyolefin chains, by a peroxidation pretreatment of the fiber, or by subjecting the polymer material to high energy radiations which cause the formation of free radicals.

These processes when applied to the previously prepared yarns, are able to remarkably modify the surface properties of the fibers and thus make the dyeing easier. However, when these processes are applied to highly crystalline yarns, the grafting of the polymer chains onto the preformed fibers takes place prevailingly on the surface and, therefore, the successive dyeing is restricted to the surface zones and the dye does not penetrate into the inside of the fibers.

Applicants have now found that it is possible to improve the reactivity and physical properties of fibers obtained from vinyl hydrocarbons or alpha-olefin polymers, by adding to the poly-alpha-olefins crystalline linear polymers having a high structural regularity. These crystalline linear polymers are obtained by the stereospecific polymerization of alkyl esters of the formula

wherein R is hydrogen, an alkyl or aryl group and $R_1$ is an alkyl radical having from 1 to 4 carbon atoms preferably $CH_3$ or $C_4H_9$, and particularly by the polymerization of the alkyl esters of the sorbic acid.

These alkyl ester polymers have a high melting point and high molecular weights (from about 10,000 to about 200,000). Furthermore, their macromolecules contain an esterified carboxyl group and a double bond having 1,4-trans enchainment for each monomer unit and this renders these polymers capable of reacting with different types of reagents.

The crystalline alkyl ester polymers used in the compositions of the present invention possess a stereoregular structure. The macromolecules of these alkyl ester polymers possess a trans unsaturation and an isotactic structure as defined by Natta et al. In fact, these alkyl ester polymers exhibit a double isotacticity in the main polymer chain and thus possess a di-isotactic structure of the erithro type, as defined by Natta et al., see Journal of Polymer Science, vol. 43, issue 142 (1960).

Therefore, an object of the present invention is to provide polymer compositions suitable for producing crystalline textile fibers, possessing improved chemical and physical characteristics and particularly an improved affinity for dyestuffs, comprising at least two polymers which are soluble in each other in the molten state, of which at least one, designated as A, is a crystallizable linear poly-alpha-olefin and at least one, designated as B, has a high molecular weight, a regular structure and is obtained by the polymerization of an alkyl ester of the formula

wherein R is hydrogen, an alkyl group or an aryl group and $R_1$ is an alkyl radical having from 1 to 4 carbon atoms preferably a methyl or butyl radical.

Additional objects and advantages will become apparent hereinafter.

It has also been surprisingly found that, in spite of the presence of the great quantity of reactive groups in the compositions of the present invention, the polymer is stable enough at high temperature, even for rather long exposure times. This stability is very important in the production of fibers, since melt spinning processes require, generally, the maintenance of the polymeric material in the process apparatus for periods of about 10 to 30 minutes, or more, at temperatures at least 20° C. higher than the complete melting of the polymer.

While other crystalline polymers containing double bonds, such as trans 1,4-polybutadiene are subject to cross-linking reactions when they are heated at temperatures of about 200° C.; the polymer obtained from the esters of the above general formula (1), which according to the present invention are admixed with the alpha-olefin polymer, can undergo gentle heating at 230-250° C. for extended periods (30 minutes and more) without being subject to cross-linking or degradation reactions.

As a result, it is thus possible to mix the crystalline alkyl ester polymers with the crystalline vinyl hydrocarbons or alpha-olefin polymers, melt said mixture at temperatures between 200° and 250° C. and from said molten mass obtain by extrusion spinning, fibers possessing good mechanical and chemical properties, particularly dyeing properties.

The two types of the polymer which make up this mixture are compatible with each other in all ratios. The fibers that are thus produced using these mixtures have properties intermediate between those of fibers obtained from each individual polymer taken alone.

The alkyl ester polymer, polymer B, may desirably be present in an amount between 5 and 90 percent by weight of the composition, preferably between 10 and 50 percent by weight.

By regulating the ratio of the two polymers which form the mixture, it is therefore possible to combine the characteristic advantages of each of the two individual polymers, so that fibers are obtained which have characteristics more suitable for ultimate uses.

For example, when crystalline polypropylene and polymethylsorbate are used as starting polymers, an increase in the percent of the polymethylsorbate in the mixture, results in the production of fibers having improved mechanical characteristics at high temperature, and a better receptivity for dyestuffs (dispersed dyestuffs).

Conversely, by increasing the percentage of polypropylene in the mixture, fibers which have a lower initial elastic modulus and a lower solubility in chlorinated solvents such as chloroform, at room temperature are produced. These fibers, however, always retain a certain reactivity for dyestuffs.

The dyeing of the fibers obtained from mixtures of the present invention can be carried out using various different types of dyestuffs, thereby taking advantage of the reactivity of the crystalline alkyl ester polymers.

The fibers obtained from mixtures containing over 30% of the polyalkylester can be dyed to sufficiently intense shades by using the dispersed dyestuffs normally used in the dyeing of acetate. Fibers possessing less than 30% polyalkylester generally give less intense shades with these dyestuffs.

Prior to dyeing the fibers obtained from the mixtures of the present invention, it is also possible to saponify polymer B by means of alkali hydroxides in aqueous or alcoholic solution. After an acidification step, fibers containing acid groups (—COOH) are thereby produced, which can be easily dyed, thus obtaining uniform colors possessing a good fastness when employing the basic dyestuffs previously used in the dyeing of other fibers such as Orlon, (polyacrylonitrile fibres), etc.

In the case of the fibers obtained from polymer compositions containing over 15% of polymer B, it is sufficient to carry out a partial saponification, in order to insure the presence, after the acidification step, of an amount of —COOH groups which are necsessary for uniformly dyed shades having a good fastness.

The fibers obtained from mixtures containing less than 15% of polymer B, on the other hand, require an almost total saponification of the ester groups contained in the fiber, in order to insure the presence, after the acidification, of an amount of reactive groups sufficient to obtain good shade tonalities.

However, in order to provide a color fastness sufficient to withstand the washing of the dyed fibers, it is preferable to subject the polymer B, which is present in the fiber to cross-linking.

This cross-linking can be carried out employing the usual vulcanization reactions, which act on the double bonds present in the polymer chain.

The vulcanization can be carried out by using mixes containing accelerators of the ultrarapid type such as tetramethylthiouramdisulfide, zinc diethyl-bis-dithiocarbamate, zinc isopropylxanthate, etc. The use of such mixes is preferred in order to achieve both (a) a reduced reactivity of the double bond of the monomeric unit of the polymer B, and (b) a vulcanization which can be carried out at sufficiently low temperatures and at reaction times which are not unduly protracted.

The saponified polymer compositions possess lyophilic characteristics depending upon the degree of saponification of the composition. Therefore, by employing this saponification expedient, it is possible to obtain textile fibers having improved wettability characteristics.

The swelling and solubility of the polymer compositions, of the present invention, can be further reduced by subjecting the polymer to a cross-linking treatment with glycols.

The alpha-olefins polymers used in the present invention can be obtained for instance by polymerizing alpha-olefins or vinyl hydrocarbons of the formula $CH_2=CHR$ wherein R is alkyl, cycloalkyl or phenyl radical, such as propylene, butene-1, 4-methyl pentene-1, styrene, etc.

This polymerization is carried out in the presence of catalysts containing a halide of a metal of the IV, V or VI group of the Periodic Table and of an organo-metallic compound of a metal of the I, II, III group of the Mendeleeff Periodic Table, such as described by Natta et al. and also as shown in patents such as Belgian Patent No. 543,259, etc.

The polymer (B) can be obtained (for instance according to our copending U.S. patent application Serial No. 101,475) by polymerizing a monomer of the above general Formula 1, in the presence of an anionic catalytic system such as a catalyst containing an organic compound or a hydride of a metal of the groups I or II of the Mendeleeff Periodic Table.

The following examples are given to illustrate but not to limit the present invention.

Unless otherwise indicated, all parts are by weight.

*Example 1*

50 parts by weight of polypropylene, having an isotactic polymer content (not extractable with boiling n-heptane) of 94%, and an intrinsic viscosity (measured in tetrahydronaphthalene at 135° C.) of 1.9, are intimately mixed with 50 parts by weight of crystalline polymethylsorbate, having an intrinsic viscosity of 0.46 (measured in tetrahydronaphthalene at 135° C.).

This mixture is introduced into a laboratory extruder wherein it is extruded through a spinneret having 8 holes possessing a diameter of 0.8 mm., under a pressure of 5–10 kg./cm.$^2$ and at a temperature of 230–235° C., thus obtaining yarns having a regularity of size.

The yarn is successively drawn in hot air at 110–115° C., with a drawing ratios from 1:3 to 1:5.

After the drawing, fibers having the following characteristics are obtained:

| | |
|---|---|
| Denier/filament | 5–10 |
| Tenacity g./den | 3–4 |
| Percent elongation | 20–25 |

*Example 2*

90 parts by weight of polypropylene having an isotactic content of 91% (not extractable with boiling n-heptane) and an intrinsic viscosity of 1.48 (measured in tetrahydro naphthalene at 135° C.), are intimately mixed with 10 parts by weight of crystalline polymethylsorbate, having an intrinsic viscosity of 0.46 (measured in tetrahydronaphthalene at 135° C.).

This mixture is extruded through a spinneret having 8 holes of 0.8 mm. diameter each, under a pressure of 5–10 kg./cm.$^2$, and at a temperature of 210–220° C.

Yarns having a good count regularity are obtained, which, after drawing (carried out with a drawing ratio of 1:5), possess mechanical characteristics almost equal to those of the polypropylene fibers.

*Example 3*

A yarn skein, obtained as described in Example 1, is kept in an aqueous dyeing bath (1 liter) containing:

| | G. |
|---|---|
| Celanthrene Brilliant Blue (C.I. 61505) | 0.5 |
| Surfactant (such as an alcohol sulfate) | 0.5 |

Ratio of yarn to the dyeing bath=1:50.

Under these conditions the yarn skein is kept for about 40 minutes at a temperature of 80–90° C. in the bath, and there is thus obtained a yarn which is intensively and homogeneously dyed blue.

Similarly, intensively dyed yellow and red yarns are obtained by dyeing, under the same conditions as above mentioned, using the following dyestuffs: Acetamine Yellow N (C.I. 48000); Acetamine Scarlet B (C.I. 11110).

*Example 4*

A yarn skein obtained as described in Example 2, is introduced into an aqueous dyeing bath (1 liter) containing 0.5 g. of dyestuff and 0.5 g. of a surfactant Fiber/dyeing bath ratio _____ 1:100
Dyeing bath temperature _____ ° C__ 90
Duration of the dyeing_____min__ 35–40

The following dyestuffs are employed: Celanthrene Brilliant Blue (C.I. 61505); Acetamine Yellow N (C.I. 48000); Acetamine Scarlet B (C.I. 11110); Celanthrene Red Violet R (C.I. 61100).

After the dyeing, yarns colored blue, yellow, red and violet respectively are obtained. The shades obtained are not as intense as those obtained in Example 3, but are of good intensity.

Example 5

A yarn skein obtained as described in Example 2 is introduced in 10% KOH ethyl alcohol solution, in which it is kept for 120 minutes at a temperature of 70–80° C., in the presence of small amounts of a surfactant.

After said saponification treatment, the fiber is treated in the warm for 60 minutes with HCl (2 N).

The fiber is then introduced into an aqueous dyeing bath containing basic dyestuffs such as Red Sevron Brilliant 3B or Deorline Red Brilliant R, and fibers dyed in the corresponding colors are so obtained.

Many variations and modifications can of course be practised without departing from the scope of the present invention.

Having thus described the present invention, what is desired to secure and claim by Letters Patent is:

1. A polymer composition consisting essentially of at least two polymers soluble in each other in the molten state, wherein at least one is a crystalline linear polymer obtained by polymerizing a vinyl hydrocarbon characterized by the formula $CH_2=CHR$, wherein R is selected from the group consisting of alkyl radicals, cycloalkyl radicals, and phenyl radicals and at least one of the others is a high-molecular weight crystalline linear polymer obtained by the stereospecific polymerization of an alkyl ester characterized by the formula $$R-CH=CH-CH=CH-COOR'$$

wherein R is selected from the group consisting of hydrogen, alkyl radicals, and aryl radicals and R' is an alkyl radical of 1 to 4 carbon atoms.

2. The polymer composition of claim 1 further characterized in that the polymer of the alkyl ester ranges from about 5 to 90% by weight of the composition.

3. The polymer composition of claim 2 further characterized in that the polymer of the alkyl ester ranges from about 10 to 50% by weight of the composition.

4. The polymer composition of claim 1 further characterized in that the alkyl ester is an alkyl ester of sorbic acid.

5. The polymer composition of claim 1 further characterized in that the polymer of the alkyl ester is polymethylsorbate.

6. The polymer composition of claim 1 further characterized in that the polymer of the alkyl ester is polybutylsorbate.

7. The polymer composition of claim 1 further characterized in that the polymer of the vinyl hydrocarbon is a propylene polymer containing at least 50% isotactic macromolecules.

8. The polymer composition of claim 1 further characterized in that the polymer of the alkyl ester contains macromolecules having trans-unsaturations and an isotactic structure.

9. The polymer composition of claim 1 further characterized in that the polymer of the alkyl ester contains macromolecules having a di-isotactic structure.

10. The polymer composition of claim 1 further characterized in that the polymer of the alkyl ester contains macromolecules having an erithro-di-isotactic structure.

11. The polymer composition of claim 1 further characterized as containing a thermoplastic material.

12. The polymer composition of claim 1 further characterized as containing a thermosetting material.

13. The polymer composition of claim 1 further characterized in that the polymer of the alkyl ester has a melting temperature near the melting temperature of the polymer of the vinyl hydrocarbon.

14. Textile fibers obtained by spinning and drawing the polymer composition of claim 1.

15. The textile fibers of claim 14 further characterized as having an affinity for basic dyestuffs in that the fibers are partially saponified.

16. The polymer composition of claim 1 further characterized in that the polymer of the alkyl ester is cross-linked.

17. The polymer composition of claim 16 further characterized in that the cross-linking agent is sulfur.

18. The polymer composition of claim 16 further characterized in that the cross-linking agent is glycol.

19. Textile fibers obtained by spinning and drawing the polymer composition of claim 16.

20. The polymer composition of claim 16 further characterized in that the polymer of the vinyl hydrocarbon is a propylene polymer comprising at least 50% isotactic macromolecules.

No references cited.

UNITED STATES PATENT OFFICE
CERTIFICATE OF CORRECTION

Patent No. 3,151,185                              September 29, 1964

Piero Giustiniani et al.

It is hereby certified that error appears in the above numbered patent requiring correction and that the said Letters Patent should read as corrected below.

In the grant, line 1, and in the heading to the printed specification, line 4, for "Riero Giustiniani", each occurrence, read -- Piero Giustiniani --.

Signed and sealed this 12th day of January 1965.

(SEAL)
Attest:

ERNEST W. SWIDER
Attesting Officer

EDWARD J. BRENNER
Commissioner of Patents